(12) United States Patent
Kumar et al.

(10) Patent No.: US 11,815,856 B2
(45) Date of Patent: Nov. 14, 2023

(54) METHOD AND SYSTEM FOR RECORDING DIGITAL HOLOGRAMS OF LARGER OBJECTS IN NON-LABORATORY ENVIRONMENT

(71) Applicant: COUNCIL OF SCIENTIFIC AND INDUSTRIAL RESEARCH, New Delhi (IN)

(72) Inventors: Raj Kumar, Chandigarh (IN); Gaurav Dwivedi, Chandigarh (IN); Omendra Singh, Chandigarh (IN)

(73) Assignee: COUNCIL OF SCIENTIFIC AND INDUSTRIAL RESEARCH, New Delhi (IN)

( * ) Notice: Subject to any disclaimer, the term of this patent is extended or adjusted under 35 U.S.C. 154(b) by 374 days.

(21) Appl. No.: 16/912,604

(22) Filed: Jun. 25, 2020

(65) Prior Publication Data
US 2020/0393792 A1    Dec. 17, 2020

(30) Foreign Application Priority Data
Jun. 14, 2019  (IN) .............................. 201911023585

(51) Int. Cl.
*G03H 1/04* (2006.01)
*G03H 1/22* (2006.01)
(Continued)

(52) U.S. Cl.
CPC ............. *G03H 1/0443* (2013.01); *G02B 5/32* (2013.01); *G02B 27/1006* (2013.01);
(Continued)

(58) Field of Classification Search
CPC .......... G03H 2260/16; G03H 2260/14; G03H 1/0443; G03H 1/2286; G03H 2223/19;
(Continued)

(56) References Cited

U.S. PATENT DOCUMENTS 5,144,461 A    9/1992  Horan
5,216,527 A *  6/1993  Sharnoff .................. G03H 1/10
                                                    359/24

(Continued)

*Primary Examiner* — Jade R Chwasz
(74) *Attorney, Agent, or Firm* — Maschoff Brennan (57) ABSTRACT

A method for optimally producing a holographic image using a Holographic Optical Element (HOE) and the HOE meant for controlling directions and divergences of light beams to impart system compactness. The system uses concave and convex lenses and other beam expanding, splitting, modulating and combining optics for realization of compactness and high throughput. The thin laser beam is split using a holographic optical element and a conventional beam splitter. A neutral density filter adjusts the intensity of a reference beam to match the intensity of an object beam so that high quality digital holograms can be recorded. Effects of vibrations are minimized by the compact optical design, by anti-vibration mounts, by mounting all the opto-mechanical components on a single rigid platform and by enclosing the system. An electro-optical sensor array records holograms digitally and an algorithm numerically reconstructs and further quantifies the results using a personal computer/laptop/tablet etc.

15 Claims, 13 Drawing Sheets

(51) Int. Cl.
  *G02B 5/32* (2006.01)
  *G02B 27/10* (2006.01)
(52) U.S. Cl.
  CPC ....... *G03H 1/2286* (2013.01); *G03H 2223/19* (2013.01); *G03H 2223/24* (2013.01); *G03H 2223/53* (2013.01)
(58) Field of Classification Search
  CPC ........... G03H 2223/24; G03H 2223/53; G03H 1/0891; G03H 1/265; G03H 2001/0033; G03H 2001/0044; G03H 2001/0232; G03H 2001/0413; G03H 2001/0436; G03H 2001/0439; G03H 2001/0445; G03H 2222/52; G03H 2222/54; G03H 2223/12; G03H 2223/17; G03H 2223/23; G03H 1/0402; G02B 5/32; G02B 27/1006
  USPC .......................................... 359/3, 10, 11, 28
  See application file for complete search history.

(56) References Cited

U.S. PATENT DOCUMENTS

| | | |
|---|---|---|
| 6,850,346 B2 * | 2/2005 | Kim .................. G03H 1/26 |
| 2012/0044320 A1 | 2/2012 | Spivey et al. |
| 2015/0268630 A1 | 9/2015 | Azzay |
| 2016/0139561 A1 | 5/2016 | Kim |
| 2016/0313559 A1 * | 10/2016 | Yamada ............... G03H 1/2645 |
| 2017/0168453 A1 | 6/2017 | Onural |

* cited by examiner

METHOD AND SYSTEM FOR RECORDING DIGITAL HOLOGRAMS OF LARGER OBJECTS IN NON-LABORATORY ENVIRONMENT

FIELD OF INVENTION

A method for optimally producing a holographic image using a Holographic Optical Element (HOE) and the HOE meant for controlling directions and divergences of light beams to impart system compactness. Compactness and Portability of digital holographic camera is required for its potential applications in different fields of observing, measuring and analyzing various phenomena and testing of components and devices. Disclosed invention efficiently suppresses vibrations and thus enables this system deployable in non-laboratory environment for various sensing, metrology and testing related applications.

PRIOR ART

US20170168453A1-patent titled, 'Wide viewing angle holographic video camera and display using a phase plate,' describes a system and a method to overcome the problem of high-resolution requirement to achieve wider diffraction angles, by incorporating a phase plate.

US20160139561A1—describes a process of creating color holographic images by generating a separate complex hologram for each of multiple different colors of an object field illuminated with incoherent light, combining the separate complex holograms to obtain a color complex hologram, and generating a reconstructed color holographic image of the object field.

US20120044320A1-patent titled, 'High resolution 3-D holographic camera' describes a method for recording high resolution holographic images where a reference spot on a target is illuminated by three spatially separated beamlets (simultaneously produced from a single laser beam), producing a lateral shear of a wavefront on the target. A flood beam illuminates the entire target and reflected speckle is also recorded by the same camera to provide the necessary object spatial frequencies. The reference spot's reconstructed complex field is digitally interfered with the flood illuminated speckle field by use of a special algorithm. Second measurement is acquired with the laser beam slightly shifted in frequency to second color. The two measurements at slightly offset colors result in a synthetic wave length measurement that is used to compute the depth profile of the illuminated target.

US20150268630A1-describes a high resolution holographic imaging system wherein a laser illuminator is configured to operate in two or more wavelengths sequentially and a phase modulator element configured to operate at three or more phase positions. The laser wavelength is shifted slightly and operation repeats. The data frames are digitized and a data processing unit implemented to calculate the complex amplitude and perform reconstruction of the image.

U.S. Pat. No. 5,144,461 patent titled, 'Portable holographic recording apparatus' illustrates a portable holographic recording apparatus to make holographic images of three-dimensional objects using film based analog holography. The invention describes a holographic camera assembly to record holograms of mainly small three-dimensional objects. The assembly is mounted on a removable optical tray in a portable light tight mechanical housing.

SUMMARY OF THE INVENTION

A method for optimally producing a holographic image using a Holographic Optical Element (HOE) and the HOE meant for controlling directions and divergences of light beams to impart system compactness.

The present invention pertains to the technical field of recording of digital holograms with an increased field of view. This enables recording of holograms of larger size objects which is generally restricted by resolution of the digital sensor array. In particular the invention discloses a technique and system for realization of portable digital holographic camera.

Digital holography is a process to record three dimensional (3D) information of the intended object by coherent superposition of object wave with a reference wave using digital means like CCD and CMOS sensor arrays and provides information about both the phase and amplitude of test object. Digital holography is a powerful tool for non-contact and non-invasive applications in non-destructive testing and metrology of a variety of materials, devices and processes. It is also widely investigated for study of live biological cells and other biomedical applications. Hologram recording process is based on the principle of generation and recording of interference fringes. In order to record good quality holograms interference fringes should be stationary of the order that path difference between interfering coherent beams should not exceed more than ¼th of the wavelength of light source during exposure time. Thus vibration isolation platforms or short pulse lasers are used for hologram recording. Process of recording holograms for different applications including holographic non-destructive testing using analog holography where conventional hologram recording materials are used is well known. Few of the camera configurations have also been reported, for example, M. P. Georges, V. S. Scauflaire, and P. C. Lemaire, described a compact and portable analogue holographic camera using photorefractive crystals for application in various metrological problems. But due to rapid growth in computational capability of personal computers as well as in the CCD and CMOS technology, digital holography is replacing analog holography for most of the applications. Also, limited commercially availability of conventional holographic recording materials contributed towards shift of researchers' focus towards digital holography. Major issue for digital holography comes from the insufficient resolution of the available digital recording devices like CCD and CMOS sensors. This limits recording of digital holograms of small size objects only and thus digital holography is currently widely used in microscopic studies. For recording digital holograms of larger size objects, distance between digital image sensor and the object becomes impractically large. In such case, a diverging lens can be used to reduce distance by creating a reduced in size virtual image of the object as proposed by Jan Mundt and Thomas M. Kreis. Use of diverging lens increases exposure time due to reduction in number of photons reaching the image sensor and hence making system more susceptible to vibrations. Efforts are being made to increase the field of view to record holograms of objects of increased sizes. Use of two digital sensor arrays is proposed by Jakub Żak, Małgorzata Kujawińska, and Michał Józwik, where, two array detectors and Liquid Crystal on Silicon (LCOS) Spatial Light Modulator (SLM) are used for sequential or simultaneous capture of two Fresnel holograms of the 3D object/scene. This configuration can record holograms of objects upto 60 mm in dimensions.

In a preferred embodiment, system uses a suitable combination of concave and convex lenses for collection of scattered light from the object to be recorded into the hologram. This combination not only makes system compact but also fast and hence helps in reduction of vibration related issues of the system. Further elegantly designed position of beam combiner, which is placed in between concave and convex lenses also imparts compactness to the system and makes it possible to record digital holograms. All the opto-mechanical components are mounted in a compact manner on single mechanical platform which is supported on vibration dumping mounts to further reduce the effect of external vibrations and thus imparting the system portability. A neutral density filter of variable density is inserted into the reference beam to control its intensity in order to obtain digital holograms of good contrast. Digital holograms, which are interference pattern generated by superposition of reference beam and the object beam, are recorded with a digital image sensor CCD/CMOS and are stored in a PC/memory device and which is processed numerically for reconstruction and thus further processing of digital holograms. These holograms may be used for various applications like display or non-destructive testing or for analysis of some materials, events, substances, components, devices, systems etc.

OBJECTIVES OF THE INVENTION

The objective of this invention is to develop a method and system enabling recording of digital holograms in non-laboratory environment Another objective is to make optical configuration compact and efficient Another objective is to reduce system's sensitivity to environmental vibrations Yet another objective is to record digital hologram of large size objects with the developed digital holographic camera Further objective is to generate high contrast interference fringes and hence to record good quality digital holograms Yet another objective is to numerically reconstruct the recorded digital holograms or digital holographic videos Yet another objective is to process and analyze the reconstructed images for further information extraction Yet another objective is to use this digital holographic camera for non-destructive testing of various components, devices and systems.

DETAILED DESCRIPTION OF THE INVENTION

A method for optimally producing a holographic image using a Holographic Optical Element (HOE) and the HOE meant for controlling directions and divergences of light beams to impart system compactness.

Figure 1:
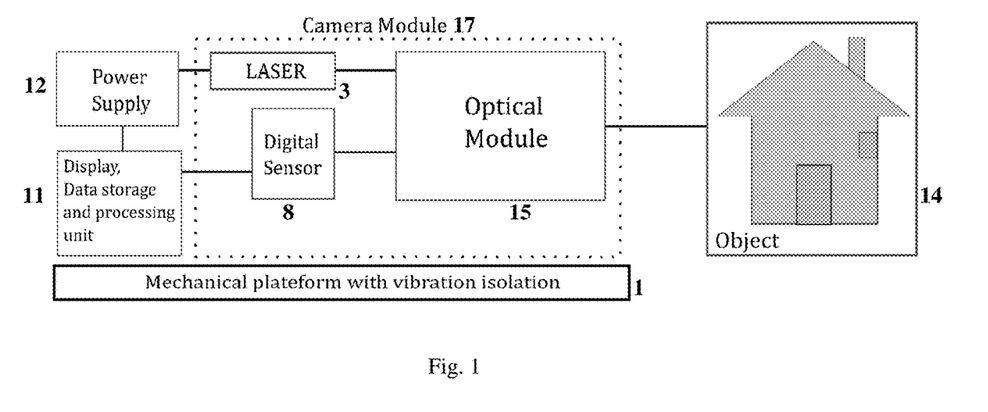
FIG. 1 depicts a block diagram of the digital holographic camera according to presently contemplated embodiment of the invention.

The advantages, features and utilities of certain embodiments of the present invention related to design and development of portable digital holographic camera will become clearer from the following description of the figures and drawings related to this invention. The description is provided in order to improve understanding about the method and the details given are merely exemplary and hence those having skill in such techniques will appreciate that various changes and modifications of the described embodiments can be made according to the requirements of particular application without departing from the scope and spirit of the invention. The figures and drawings are used for illustration only to aid in improving the understanding about the method. A block diagram of the invented digital holographic camera is shown in FIG. 1, wherein a diode laser 3 is used as a source of coherent light for illumination of the object 14 to be recorded and for recording the digital holograms, optical module 15 include various beam shaping, beam steering, beam splitting and combing optical components required to achieve compactness of the system with high fidelity, a portion of the laser beam after desired modulation by optical components illuminates the object which is to be recorded into the hologram, digital holograms are recorded by an electro-optical device which collects the light from optical module and record digital holograms which may be a CCD or CMOS sensor array 8, a rechargeable power supply powers the laser, display and storage units to which the electro-optical sensor array is connected and the whole camera module 17, power supply and storage unit is placed on a mechanical platform 1 with vibration isolation. The required electrical power may be supplied through electricity storage rechargeable devices or may directly be taken from the main electricity point and data storage and processing module include a data storage device, which may be a personnel computer, stores the digital holograms recorded by electro-optical sensor array and numerically process these through the developed algorithm and display the processed results.

Figure 2:
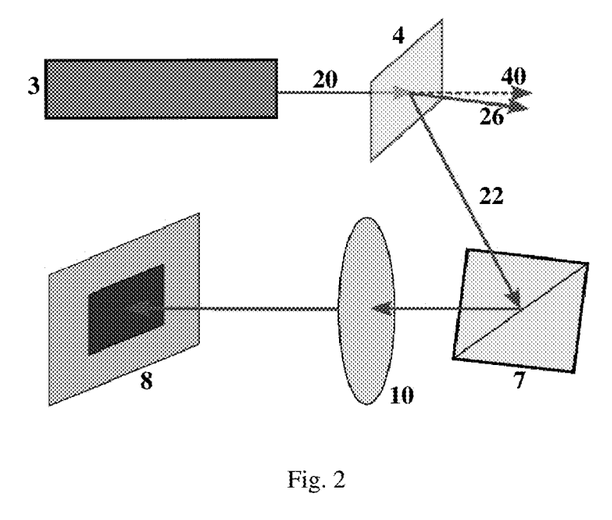
FIG. 2 shows beam steering optics for reference beam in the preferred embodiment.
Figure 3:
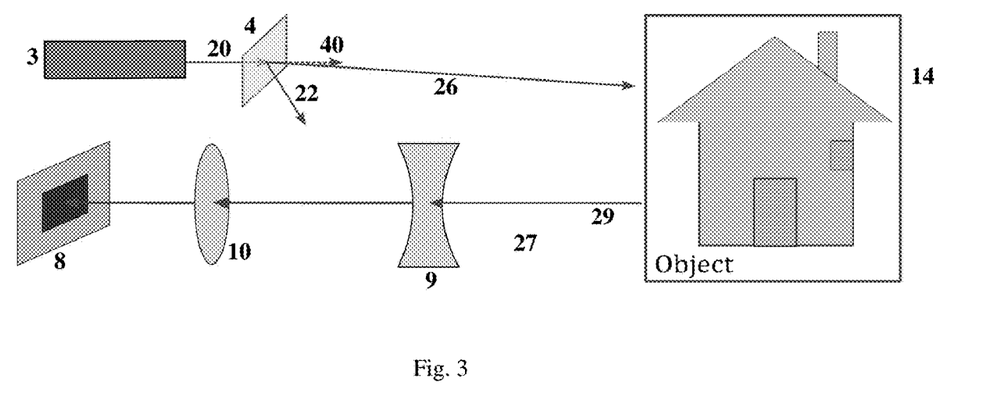
FIG. 3 shows beam steering optics for object beam in the preferred embodiment.
Figure 4:
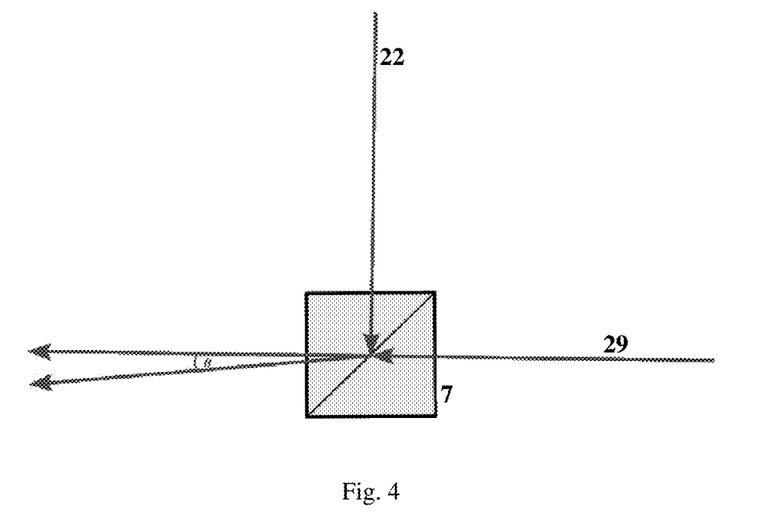
FIG. 4 is a schematic representation of combination of reference and object beams by the beam combiner of the present invention.
Figure 5:
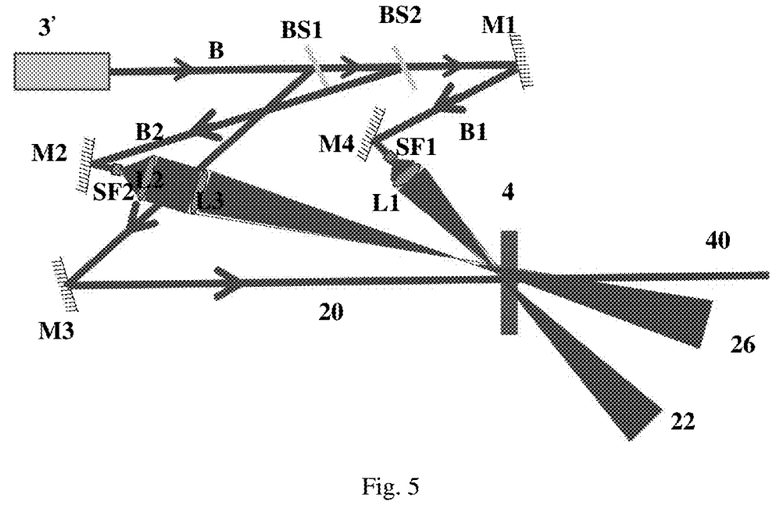
FIG. 5 shows a schematic of the recording of holographic optical element (HOE) used to serve as beam divider as well as controlled divergence directional beam expander for realization of compact system.
Figure 6:
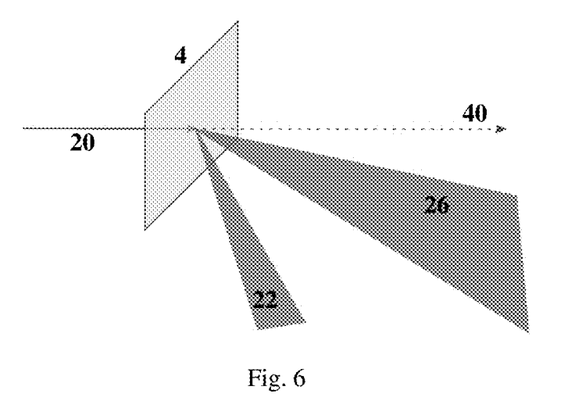
FIG. 6 shows a schematic of reference and object beams generated with single thin laser beam using HOE of the present invention.
Figure 7:
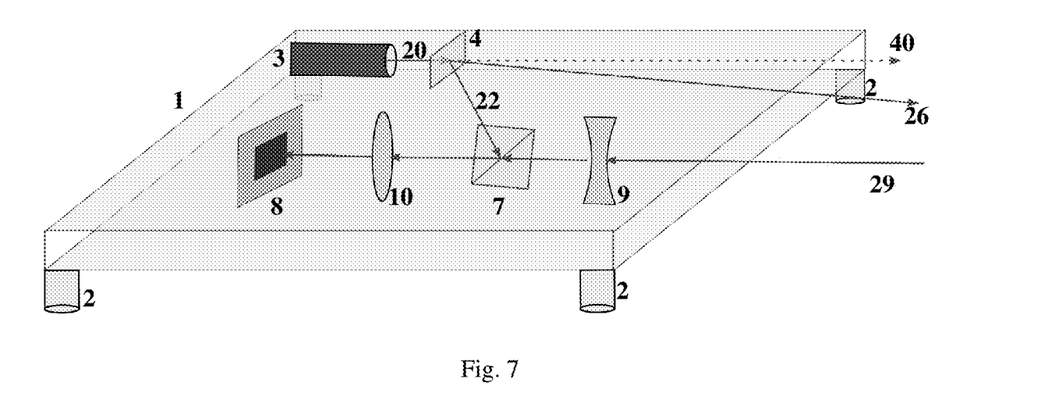
FIG. 7 is a plan view of a schematic representation of the first preferred (HOE based) layout of the elements of the present invention.

FIG. 2 shows propagation of a portion of laser beam through various optical components and this beam ultimately strikes the electro-optical sensor as reference beam. Here 3 is a laser source (we used diode laser of sufficient coherence length and optical power) to deliver a thin laser beam 20 which passes through a specially designed and fabricated holographic optical element (HOE) 4 that splits it into two beams having desired directions and controlled divergences, one of the beams 22 falls on an optical beam combiner 7 where it is reflected and passed through a convex lens 10 to the electro-optical sensor 8. Another beam 26 generated by the HOE, as shown in FIG. 3, illuminates the object 14 whose hologram is to be recorded. Light scattered 29 by the said object is intercepted by a concave lens 9 to generate a smaller virtual image 27 of the said object that is relayed beyond electro-optical sensor plane by the convex lens. The said object beam 29 is combined with the reference beam 22 by the beam combiner 7 and generates interference fringes upon superposition with reference beam in the electro-optical sensor plane 8. The process of beam combining is illustrated in FIG. 4 where maximum value of angle θ between reference beam 22 and object beam 29 is decided by the spatial resolution of the electro-optical sensor 8. The holographic optical element (HOE) is a holographically fabricated specialized element which combines functions of beam expander and beam splitter with control over directions and divergences of the generated beams, imparting system compactness. The scheme of optical arrangement used for recording of the HOE is shown in FIG. 5. Here He—Ne laser (3') emits laser beam B which is divided into three beams B1, B2 and 20 with the help of beam splitters BS1 and BS2 and is steered with mirrors M1, M2, M3 and M4 into desired directions (as per design of the HOE for this specific application). Beam 20 remains unexpanded and is incident normally on the hologram recording plate 4' (we used silver halide hologram recording material coated on a glass substrate but other hologram recording materials may also be used) while beams B1 and B2 are expanded using spatial filters SF1 and SF2. Lenses L1, L2 and L3 are used to given required divergence to beams B1 and B2 which are incident from specific angles on 4'. After desired exposure to laser 4' is chemically processed with D-19 developer and R-9 bleach. This chemically processed holographic plate 4' becomes the desired HOE 4. A process of beam splitting by HOE 4 is shown in FIG. 6 where HOE 4 creates dc beam 40, object beam 26 and reference beam 22 with controlled divergences and desired directions from single thin laser beam 20. A plan view of the schematic representation of the first preferred physical layout of the various opto-mechanical elements of the present invention are shown in FIG. 7.

Figure 8:
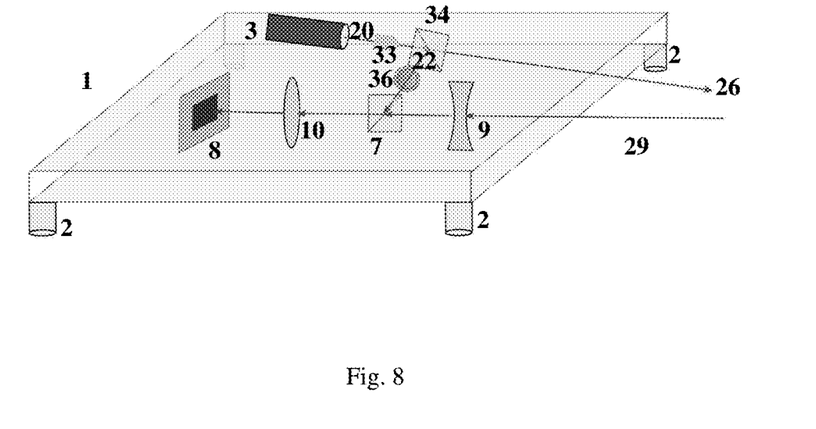
FIG. 8 is a plan view of a schematic representation of the second preferred (beam splitter based) layout of the elements of the present invention.

In another preferred embodiment shown in FIG. 8, thin beam 20 from laser source 3 is expanded by beam expander 33. This expanded beam is split into two by an optical beam splitter 34 where reflected portion 22 passes through a neutral density filter 36 of variable transmission to an optical beam combiner 7 where it is reflected and passed through a convex lens 10 to the electro-optical sensor 8 and the transmitted portion 26 of expanded beam illuminates the object. Neutral density filter 36 is mounted on a motor for remote control of power to achieve high contrast of the interference fringes. In this embodiment other components remain the same as described in FIG. 2, FIG. 3 and FIG. 6 to impart functioning to the system.

Figure 9:
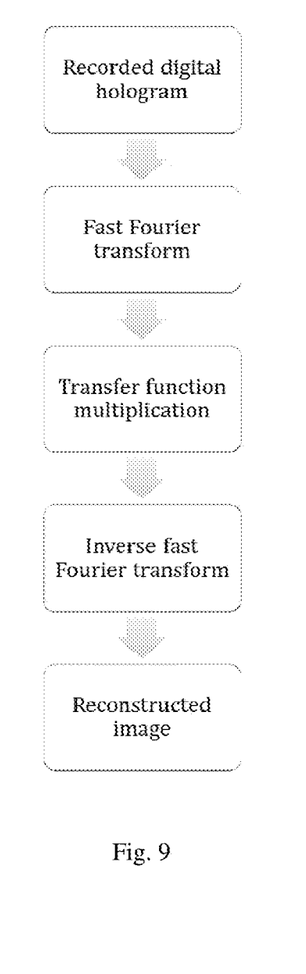
FIG. 9 is a flow chart for a preferred reconstruction algorithm.
Figure 10:
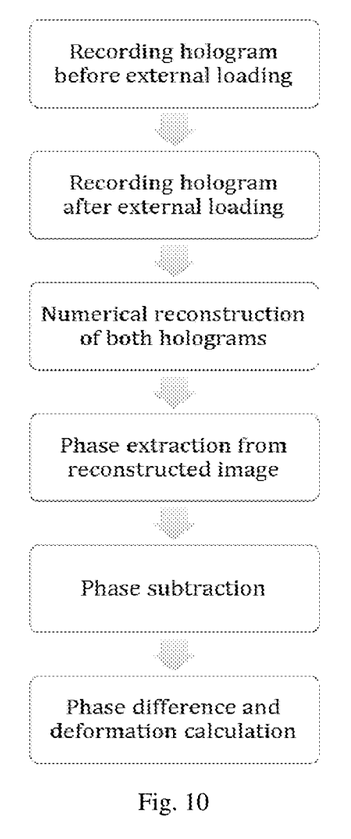
FIG. 10 is flow chart for performing non-destructive testing using present invention.

This whole setup is made on a solid mechanical platform 1 which is supported on special anti-vibration mounts 2 to minimize the effect of ground vibrations. The complete opto-mechanical system is further enclosed in the mechanical housing for aesthetic as well as to minimize the effect of environmental vibrations and thermal fluctuations on the functioning of the invented digital holographic camera. This housing also helps in keeping the components dust free and hence in good performance as well as save it from any accidental misalignment of the components. FIG. 9 shows flow chart for the processing and numerically reconstruction of recorded digital holograms and flow chart for quantitative analysis of samples using digital holographic non-destructive testing is shown in FIG. 10.

Other possible optical configurations may be used, like in preferred embodiment combination of beam expander and beam splitter may be designed and developed to generate the diverging reference and object beam upon illumination with a thin laser beam or pig-tailed lasers with optical fiber based variable beam splitting may also be used to obtain the object and reference beams instead of using the above described holographic optical element. Various components in the figures are illustrated for simplicity and clarity and are not drawn to the scale.

Example

Figure 11:
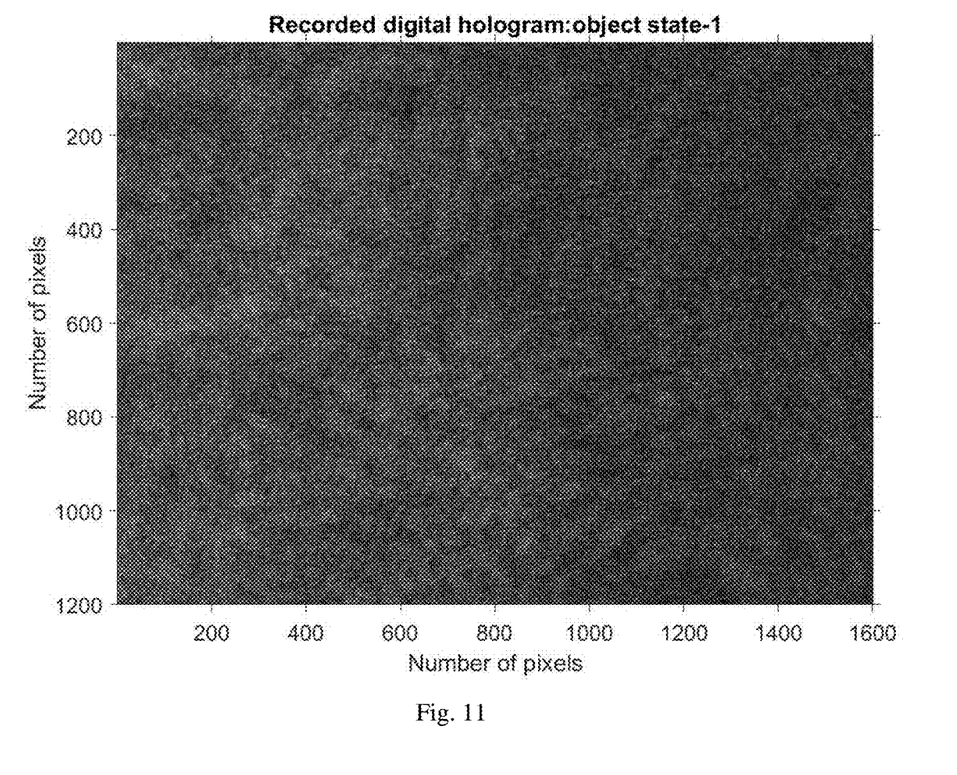
FIG. 11 shows photographs of experimentally recorded digital holograms.
Figure 12:
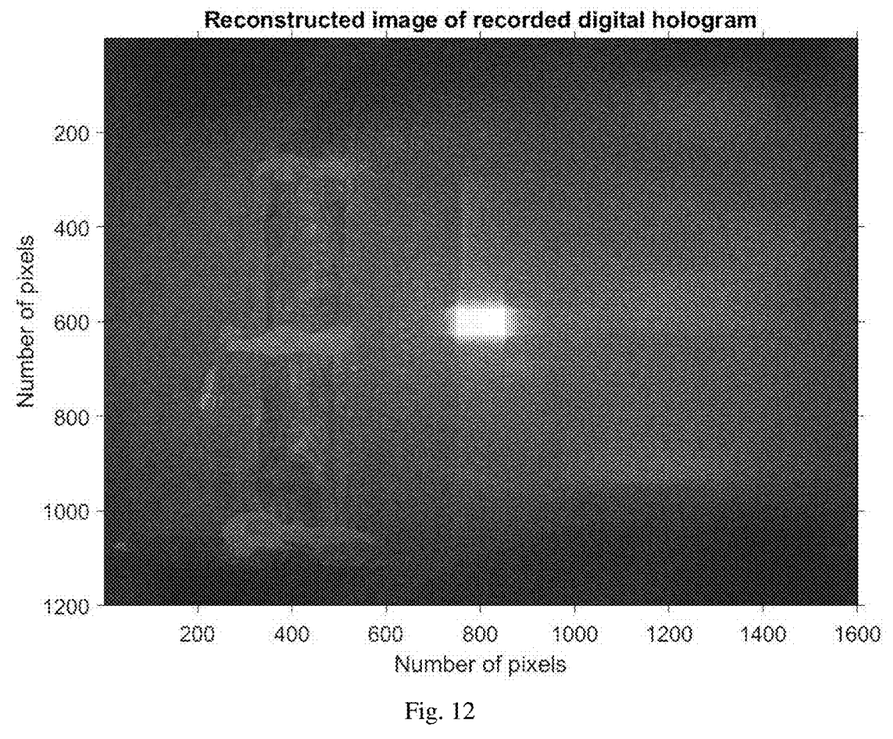
FIG. 12 shows photographs of reconstructed images from experimentally recorded digital holograms.
Figure 13:
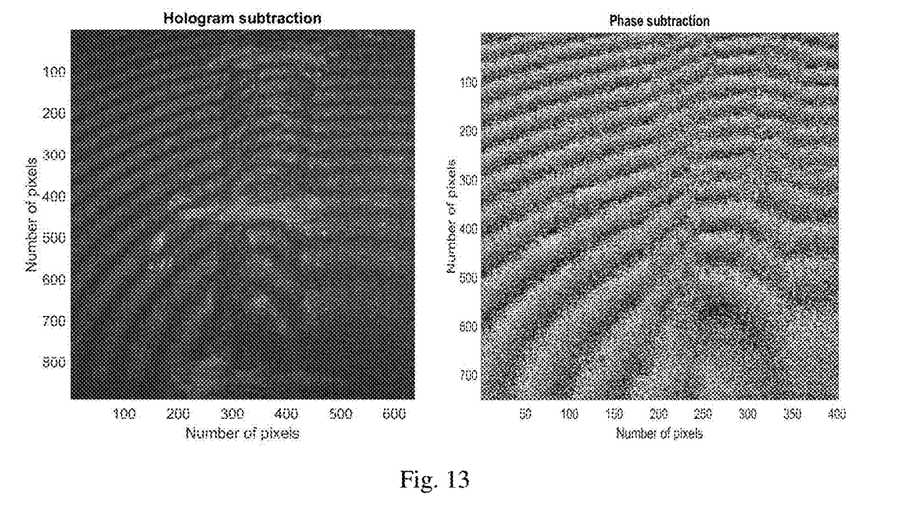
FIG. 13 shows results obtained after non-destructive testing of a weld joint using invented digital holographic camera.

In order to demonstrate the functionality of the invented portable digital holographic camera all the opto-mechanical components were mounted on a mechanical platform 1 supported on four anti-vibrations mounts 2. Combination of a concave lens and a convex lens was used to record Fresnel holograms of diffuse objects of sizes upto 4900 $mm^2$ (100 mm×49 mm) placed at a specified distance from the concave lens. A diode laser of coherence length around 2 meters and optical power of 30 mW giving elliptical beam is used to record digital holograms in present embodiment but other beam profiles and lasers can also be used. Thin laser beam is expanded with a microscopic objective (45×) and expanded beam is divided by a cube beam splitter. Beam expansion ratio is selected such that it illuminates the object suitably placed at predefined location from the digital holographic camera while reference beam gets expanded enough to the amount such that it just fills whole active area of the electro-optical detector, a CMOS sensor in this preferred embodiment. A neutral density filter of variable density is inserted in the path of reference beam in order to match intensities of the reference beam and the object beam at the sensor plane to generate high contrast fringes and hence good quality digital holograms. A cube beam combiner, placed in between concave and convex lenses, combines reference and object beams. This position of beam combiner also helped us in the realization of compact optical configuration of this digital holographic camera. The beam combiner allows object beam to be transmitted while it reflects the reference beam along the direction of travel of the object beam. This beam combiner helps in adjusting small angle between object and reference beams in order to record off-axis digital holograms. Maximum angle here is limited by resolution of the electro-optical detector i.e. by the pixel size of the CMOS sensor. Beam combiner made both the beams to overlap in the sensor plane which records this interference pattern in the form of digital hologram. Photograph of one such digital hologram recorded with the invented digital holographic camera is shown in FIG. 11. For present embodiment the recorded digital hologram is stored in a personal computer. This hologram is numerically reconstructed with the numerical reconstruction algorithm and one such reconstructed image is shown in FIG. 12. The digital holographic camera is further used for non-destructive testing applications and one such example is demonstrated through testing of a weld joint by generation of holographic interferometric fringes as shown in FIG. 13. Here two digital holograms of the said object were recorded, one before external loading and second after the loading by thermally heating it. Both recorded digital holograms are numerically reconstructed and their phases were subtracted to get the interference fringes due to change in phases as an effect of loading. Discontinuity or anomaly in the fringes represents presence of defect in the test object. Thus, these examples demonstrate applicability and functioning of the invented digital holographic camera. In preferred embodiment the specifications of these opto-mechanical components may be changed according to the requirements of the sample and its features to be studied.

Advantages

The developed portable digital holographic camera has following advantages over other systems:

1. Uses novel optical design for increased field of view and reduced exposure time
2. Developed digital holographic camera is portable
3. Arrangement is made for effective vibration isolation
4. Usage of specially designed and fabricated HOE, which reduces number of optical components, thus helps to make system compact
5. Neutral density filter of variable density enables adjustment of intensities of object and reference beams
6. Camera can be deployed in non laboratory environment
7. System is suitable for many applications like study of vibrations, de-bonding of materials, non-destructive testing etc.
8. Uses efficient algorithm for reconstruction of recorded digital holograms and videos and their further analysis.

The invention claimed is:

1. A method for producing a holographic image of an object, the method comprising:
    dividing an input beam into a first beam, a second beam and a third beam using beam splitters;
    steering the first beam, the second beam and the third beam into desired directions;
    keeping the third beam unexpanded and making the third beam incident normally on a hologram recording plate; and
    generating an object beam and a reference beam; and
    wherein a holographic image is produced in a compact and vibration resistant manner by passing light scattered from the object through at least one negative lens to form a reduced image of the object and at least one positive lens that gathers more light.

2. The method for producing a holographic image as claimed in claim 1, wherein the object beam suitably illuminates the object whereas the reference beam is expanded to the amount such that the reference beam just fills the whole active area of the electro-optical detector followed by a beam combiner that combines reference and object beams by adjusting any small angle between them for recording off-axis digital holograms.

3. The method for producing a holographic image as claimed in claim 2, wherein the expanded beam is split into two by an optical beam splitter.

4. The method for producing a holographic image as claimed in claim 3, wherein the transmitted portion of the expanded beam passing through the optical beam splitter illuminates the object.

5. The method for producing a holographic image as claimed in claim 3, wherein the reflected beam from the optical beam splitter passes to an optical beam combiner to generate interference fringes upon superposition with the object beam in an electro-optical sensor plane.

6. The method for producing a holographic image as claimed in claim 5, wherein high contrast of interference fringes is achieved by matching intensities of the reference beam and the object beam through a neutral density filter of variable transmission densities.

7. The method for producing a holographic image as claimed in claim 2, wherein a light diverged through the microscopic objective suitably illuminates the object and the expanded beam is divided by a cube beam splitter.

8. The method for producing a holographic image as claimed in claim 2, wherein the optical beam combiner reflects the reference beam and passes the object beam and then both beams travel through a convex lens.

9. The method for producing a holographic image as claimed in claim 8, wherein the convex lens relays the reduced virtual image produced by the concave lens at a predefined plane with respect to the plane of electro-optical sensor.

10. The method for producing a holographic image as claimed in claim 2, wherein the electro-optical sensor is an array of Charge-coupled device (CCD) or Complementary Metal Oxide Semiconductor (CMOS) sensors of preselected pixel size and resolution.

11. The method for producing a holographic image as claimed in claim 1, wherein the beam combiner allows the object beam to be transmitted while reflecting the reference beam along the direction of the object beam.

12. The method for producing a holographic image as claimed in claim 1, wherein a reduced virtual image of the object is produced using a concave lens.

13. The method for producing a holographic image as claimed in claim 1, wherein a beam expansion ratio is selected such that the object suitably placed at predefined location from the camera is illuminated, while the reference beam is expanded to an amount such that the expanded reference beam just fills the whole active area of an electro-optical detector.

14. The method for producing a holographic image as claimed in claim 1, wherein an optical fiber based variable beam splitter is illuminated by pig-tailed lasers to obtain the object and reference beams.

15. A Holographic Optical Element for controlling directions and divergences of light beams to impart system compactness, comprising:
    at least one holographic recording plate;
    a thin laser beam that, during operation, is divided into at least three beams;
    at least three lenses for giving required divergence to the beams incident from specific angles on said plate;
    at least two mirrors for steering the beams into desired directions;
    at least three spatial filters for expanding the beams; and
    at least two beam splitters, for splitting the beams in desired ratios;
    wherein a holographic image of desired characteristics is produced in compact and vibration resistant manner by steering, expanding, reducing, splitting and passing the light beams through the holographic recording plate to create a Zero Order (DC) beam, reference beam, and an object beam.

* * * * *